United States Patent Office 2,985,597
Patented May 23, 1961

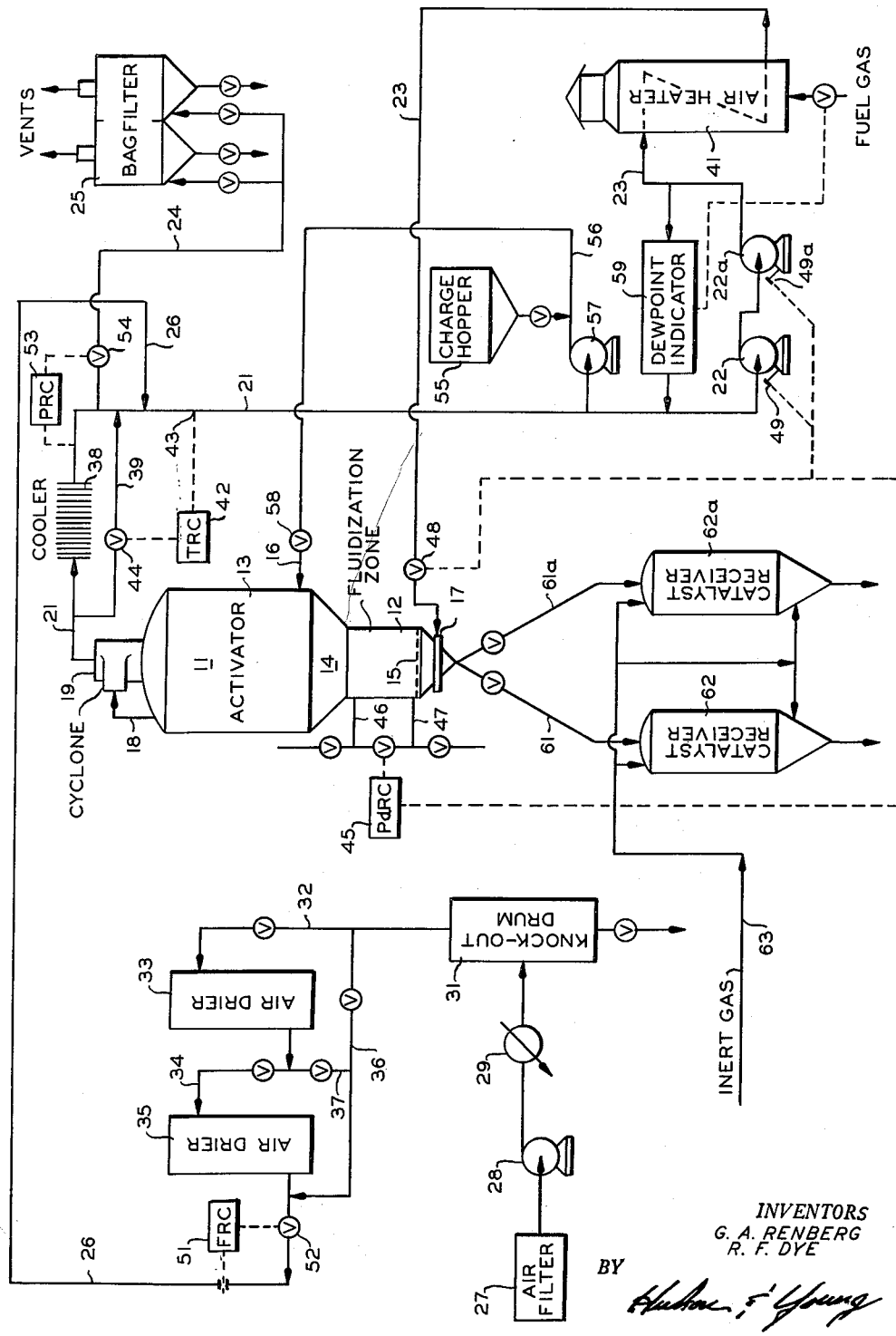

2,985,597
CATALYST ACTIVATION
Robert F. Dye and Graham A. Renberg, Bartlesville, Okla., assignors to Phillips Petroleum Company, a corporation of Delaware Filed Aug. 20, 1956, Ser. No. 604,950
8 Claims. (Cl. 252—467)

This invention relates to a process for activating solid catalyst. In one of its more specific aspects it relates to an improved method of activating catalyst in a fluidized bed. In another of its more specific aspects it relates to an improved process for activating a particulate polymerization catalyst comprising chromium, a portion of which is hexavalent, as chromium oxide. In another aspect this invention relates to an improved apparatus which is suitable for catalyst activation and to a control system for such an apparatus.

Many solid catalyst compositions, particularly those employed in hydrocarbon conversion operations such as polymerization, cracking, dehydrogenation, and the like, require for maximum effectiveness an activation treatment which comprises subjecting the raw catalyst to elevated temperatures for an interval of time, while passing over this catalyst a stream of gas which is inert, non-oxidizing, non-reducing, dry or the like, depending on the particular nature of the catalyst and its intended use. In the activation of particulate metallic oxide catalysts, especially those used in the polymerization art, it is often advantageous to heat the catalyst by contacting it while in a fluidized state with a stream of non-reducing gas at elevated temperatures. One of the objects of such a treatment is the removal of moisture from the catalyst, since water is a catalyst poison in many applications. Control problems are inherent in such processes because while it is desirable to maintain a steady fluidization of the catalyst bed and constant gas through-put rate, it is also necessary to remove impurities and catalyst poisons from the system continuously. Good temperature control of the catalyst bed depends upon effective fluidization and a stabilized gas-catalyst contact rate.

In their simplest form catalyst activation processes comprise drying and heating air and passing it through a catalyst bed at a constant rate until the catalyst reaches the desired temperature, at which point the temperature of the activating air is stabilized and the catalyst is held at the activation temperture for the proper length of time. In such a process exhaust gases are vented since attempts to recycle them result in the buildup of impurities within the system and the consequent poisoning of the catalyst. Such a process is expensive because of low heat economy and the cost of solids separation equipment which must be used to remove the catalyst fines from the exhaust stream. Such catalyst removal is essential both from the material loss standpoint and because catalytic materials are often quite corrosive or may constitute a health hazard if discharged into the atmosphere.

We have now discovered an improved process and suitable apparatus for carrying out a catalyst activation with excellent thermal efficiency and savings in catalyst separation equipment. Also, according to our invention, a constant catalyst fluidization rate can be readily effected and the temperature control of the operation is both simplified and more sensitive. The process of our invention comprises activating a particulate metallic oxide catalyst by contacting the catalyst with non-reducing gas at activation temperature and a velocity sufficient to mainain the catalyst in a fluidized state, recirculating the gas, purging therefrom a portion of the gas so as to prevent the buildup of impurities within the circulating stream, and adding makeup gas approximately equal to the amount purged thereby enabling a circulating rate which is substantially independent of the makeup and purge rates. We have also found that the optimum time for catalyst activation can be determined by the dew point of the air leaving the activation zone.

The apparatus of our invention comprises an elongated chamber having a lower fluidizing section and an upper disengaging section with a substantially frusto-conical connecting section. The disengaging section has a cross-sectional area substantially greater than the cross-sectional area of the fluidizing section. A grid or perforated plate is disposed horizontally across the bottom of the fluidizing section, and means for admitting air is provided beneath the grid with an outlet for the air at the top of the disengaging section. Still another feature of our invention is a control system which monitors the rate of fluidizing air by detecting the pressure drop across the fluidized catalyst bed, in cooperation with a rate of flow controller in the gas makeup line and a pressure controller which balances the purge rate with the makeup rate. An additional feature of our invention is a dew point indicator which enables an accurate control of catalyst activation time.

It is an object of this invention to provide a catalyst activation process having improved thermal efficiency. It is another object of this invention to provide a catalyst activation process in which catalyst poisons are purged from the system and makeup gas is added in such a manner that the catalyst fluidization rate can be maintained substantially constant. It is another object of this invention to provide a process in which the optimum period for catalyst activation can be determined by dew point measurements of the recirculating activation gas. It is still another object of this invention to provide an improved apparatus suitable for catalyst activation processes, and still another object is to provide a control system to be used with such an apparatus. Other objects and advantages and features will become apparent to those skilled in the art from the following description and drawing which depicts schematically the process and apparatus of our invention.

In its broadest aspect our invention deals generally with the activation of catalyst by controlled heat treatment while in a fluidized state, and many different types of catalytic materials can be advantageously treated by the process of our invention. It is further practicable to utilize the apparatus of our invention in catalyst regeneration operations by varying the operating conditions to achieve the effects desired. More particularly, however, our invention deals with and was developed especially for the activation of particulate metallic oxide catalytic materials such as those used in the polymerization art. A catalyst for which our invention is especially valuable is a recently developed polymerization catalyst comprising chromium, a portion of which is hexavalent (preferably at least 0.1 percent by weight of the total catalyst) as chromium oxide. In this catalyst the chromium oxide is associated with at least one oxide from the group consisting of silica, alumina, thoria, and zirconia; and the total chromium content is preferably between 0.1 and 10 weight percent. This catalyst is extremely valuable in the polymerization and copolymerization of polymerizable olefins, especially aliphatic and cyclic olefins including both mono- and diolefins, for example, ethylene, butadiene and the like. Among the examples of the preferred class of products which can be obtained in processes using this catalyst are homopolymers of ethylene, propylene, 1-butene, 1-pentene and the like, and copolymers of ethylene with propylene, 1-butene, 2-butene, or butadiene and the like. A preferred use for this catalyst is the polymerization of aliphatic 1-olefins with a maximum of 8 carbon atoms per molecule and no branching nearer the double bond than the 4 position. Such a polymerization is ordinarily carried out at a temperature between 150 and 450° F., and the pressure can vary over a wide range, for example, from atmosphere to 1000 pounds per square inch absolute or above. It is preferred that a solvent be used which is liquid and inert under contacting conditions, such as naphthenic hydrocarbons and paraffinic hydrocarbons of from 3 to 12 carbon atoms, for example, isooctane and cyclohexane. In such cases the catalyst can be employed in a slurry form in the solvent, contacting the polymerizable material which is dissolved in the solvent, although fixed bed systems are also operable.

The activity of such a catalyst is considerably affected by the manner in which it is made and treated prior to the polymerization step. A catalyst of the type described can be prepared by impregnation of a synthetic silica-alumina gel cracking catalyst with chromic acid. The catalyst base is immersed in an aqueous solution of chromic acid of proper concentration to produce a catalyst with the specified chromium content. Following the impregnation step the catalyst is allowed to drain until the excess liquid is removed. The catalyst is then dried at a relatively low temperature, for example about 150° F. and below, to a water content of about 3 to 5 weight percent, after which grinding and classification may be necessary to produce a catalyst having an average particle size in the desired range. Catalysts ranging in average particle size from 10 to 500 microns can be satisfactorily activated using our invention. The raw catalyst is then activated by fluidizing it in air and heating it while fluidized to an elevated temperature. It is ordinarily maintained at this elevated temperature for a length of time depending upon the temperature used and degree of activation desired, and then cooled and stored in an inert atmosphere prior to being used for polymerization.

The process variables for catalyst activation can vary over a wide range and the catalyst will still exhibit some activity. There are, however, optimum conditions for each type of catalyst, and our invention provides the process and apparatus by which these variables can be effectively controlled.

One embodiment of our invention includes a closed gas circulating system comprising a blower, an activation chamber, and conduits connecting the exhaust of the blower with the bottom of the chamber and the top of the chamber with the intake of blower. Downstream of the blower is a heater which heats the gas on its way to the activation chamber, and downstream of the chamber is a cooler which cools the gas before it re-enters the blower. Also downstream of the activation chamber is a purge outlet which should include suitable filtering means, such as fiber, ceramic, or metal filters to remove catalyst fines. If bag filters are used it is preferred that the purge outlet be located downstream from the cooling means. Upstream from the blower a makeup gas inlet is located to replace gas purged. This gas should be filtered and cooled to reduce the load on the recirculating gas cooler and part of this makeup gas can be introduced at the blower bearings to serve as cooling media for these bearings.

Solid, granular catalyst having an average particle size in the range of 10 to 500 microns is charged to the activation chamber forming a bed therein on a grid or perforated plate. This catalyst bed is fluidized by passing a stream of air through it at a velocity less than the terminal velocity of most of the catalyst particles. Some of the catalyst will be entrained in the air stream, however, and in the upper portion of the activating chamber the cross-section is increased to lower the air velocity and drop out these catalyst particles. The air leaving the activation chamber can be passed through a cyclone separator to remove residual catalyst from the stream although it is quite probable that even so, some catalyst fines will remain in the recirculating stream and be collected in the purge filters. Normally the catalyst bed will be fluidized during charging and after the batch is in the activator the heating of the circulating air is begun. When activation temperature is reached in the catalyst bed the temperature is stabilized and held for a period of time and then cooled. The activated catalyst is discharged from the activation chamber and a new batch is charged to repeat the cycle.

To more clearly explain our invention reference is now made to the attached drawing. In this drawing an elongated vessel 11 is the catalyst activator. This vessel comprises a lower section 12 in which the catalyst fluidization occurs and an upper section 13 which serves to disengage the catalyst particles from the fluidizing air stream by reducing the velocity thereof. It is necessary, therefore, that the upper disengaging section have a larger cross-section than the lower fluidizing section. The ratios of cross-sectional area are to a certain extent a problem in economics, and ratios as high as 40 to 1 are theoretically but not economically practical. It is preferred, therefore, that the disengaging section have a cross-section of about four times that of the fluidizing section. These two sections of the activator are connected by a third section 14 which is substantially frusto-conical, having sides with a greater slope than the angle of repose of the catalyst. For most materials contemplated, a slope of 60° would be adequate. At the lower end of the fluidizing section a grid or perforated plate is horizontally disposed, having a relatively low percentage of free area, for example about 1 to 5 percent with holes of approximately 0.25 to 3 inches in diameter, depending on the catalyst particle size. These figures are exemplary and the optimum free area will also depend upon the over-all size of the activation vessel. Near the lower part of the disengaging section an inlet 16 is provided for the introduction of granular catalytic materials which, when introduced to the activator, form a bed upon grid 15 in the fluidizing section. Below grid 15 inlet means 17 is provided for the introduction of the activating air stream and an outlet 18 for the stream is provided at the top of the disengaging section. The outlet is also equipped with a cyclone separator 19 which separates catalyst particles not removed from the air stream in the disengaging section. A conduit 21 connects the cyclone with blowers 22 and 22a in series, and conduit 23 connects the exhaust of the blowers with activator chamber inlet 17, thus completing the recycle circuit. Extending from conduit 21 is purge line 24 leading to bag filters 25; and leading into line 21, downstream of purge line 24, is makeup line 26 through which fresh activating gas is introduced to the system. Air filter 27, blower 28, condenser 29 and knockout drum 31 are connected in series to filter and partially dry the makeup gas, which is usually air. Conduit 32 connects the knockout drum with air dryer 33, which in turn is connected by conduit 34 to a second dryer 35. Any suitable desiccant, such as bauxite, can be used in these dryers which are of conventional design. Also a regeneration heater can be used in combination with this system to heat a portion of the air from conduit 32 and pass it through a dryer not in use, thereby regenerating it. Bypass lines 36 and 37 enable the bypass of either or both dryers.

In conduit 21, upstream from the purge outlet line 24, is an air fin heat exchanger 38 coupled with a bypass line 39. These features enable the activation air to be cooled prior to passing through the bag filters 25 or the blowers 22. Heat exchanger 38 is also used to cool the recirculating air stream during the cooling portion of the activation cycle. The air stream is reheated in conduit 23 by air heater 41 prior to re-entering the activation chamber. Air heater 41 can be of any suitable type, for example, a tubular gas-fired heater.

The temperature of the air stream in conduit 21 is controlled by temperature controller 42 having a temperature sensitive element 43 in conduit 21 and operatively connected to control valve 44 in cooler bypass 39. In processes where higher activation temperatures are used, for example above 600° F., it is desirable to partially cool the recycle stream so that expensive blowers and catalyst separation equipment will not be required.

To enable a satisfactory control of a substantially constant air velocity for fluidization, differential pressure controller 45 is used in combination with pressure lines 46 and 47 positioned at upper and lower points, respectively in the fluidizing section to measure the pressure drop therethrough. Differential pressure controller 45 is operatively connected to control valve 48 in conduit 23, thereby regulating the rate at which the air stream enters the activator. Turbine control valves 49 and 49a are also regulated by pressure controller 45, thus varying the speed of blowers 22 and 22a. This combination enables major air velocity changes to be made by regulating the speed of the blowers while more sensitive adjustments can be made with valve 48. Makeup air in line 26 is controlled by flow recorder 51 controlling valve 52 and thereby enables a constant addition of makeup air to the system. Pressure controller 53 controls valve 54 in purge line 24 and serves to stabilize the pressure within the system by purging an amount of air approximately equal to the air added through line 26.

In the process of this invention a catalyst activation is carried out batchwise. Raw catalyst in hopper 55 is conveyed by a pneumatic system comprising line 56 and blower 57 through valve 58 into activator 11. Catalyst falls into the fluidizing zone 12, forming a bed depth which is satisfactory for fluidization. For example, when a catalytic material of the type and size described above is fluidized, the optimum minimum bed depth is approximately 4 feet. A minimum bed depth is preferred for any given quantity of catalyst to allow a greater cross-section and hence greater gas volume flow rate which in turn reduces activation cycle time. The fluidizing section in such a case should be 8 to 10 feet long to allow for approximately 100 percent bed expansion under fluidizing conditions. After the activator has been charged, valve 58 is closed and blower 57 is shut off. The bed is fluidized by passing an air stream from blowers 22 through line 23 into inlet 17. The fluidizing velocity depends upon catalyst particle size. The minimum velocity must be sufficient to cause incipient fluidization, and the maximum is the terminal velocity of the catalyst particles. Ordinarily with catalyst of the size described the air velocity in the fluidizing zone is about 0.1 to 10 feet per second and preferably from about 1.2 to 1.6 feet per second. In the disengaging zone the air velocity is reduced considerably to permit entrained catalyst particles to return to the fluidizing section. In this section the velocity is ordinarily from about 0.01 to 9 feet per second and preferably from about 0.3 to 0.4 foot per second. This would allow a satisfactory disengaging of almost all of the catalyst before it leaves the activator. The air is recirculated to the blowers and heated to bring the catalyst to the satisfactory activation temperature. Meanwhile, fresh air is brought into the system through makeup line 26, having been filtered, cooled, and the moisture removed. During the initial part of the cycle the makeup air bypasses the dryers 33 and 35 and is added at a constant rate equal to a small fraction of the total recirculation rate, for example, about 5 to 25 volume percent, preferably about 10 percent. Adding the makeup air to the system causes the pressure to increase, which is offset by purging an approximately equal amount of air through line 24. In this way moisture and catalyst poisons are purged from the system and the catalyst is activated with a recirculating stream that is substantially independent of the makeup and purge rates. Also, during the "heat-up" portion of the activation cycle the pressure of the system tends to increase and the purge rate is thereby greater. This is advantageous because during this part of the cycle the amount of moisture being driven off the catalyst is highest and hence the need for purge is greater. Likewise, during the cooling part of the cycle the purge rate is lower and the need for purge is less since the moisture has by this time been removed.

Although it is possible to use undried air throughout the entire activation cycle, the activity of the catalyst suffers accordingly. It is not necessary, however, to dry the air at the beginning of the cycle. Undried air can be used until the catalyst temperature nears the desired activation temperature at which point the makeup air is passed through the dryers. The activation temperature can vary over a broad range, for example, from 400 to 1750° F., and the holding time will vary accordingly. At the highest temperature the activation time could be a matter of a few seconds, and at the lowest temperature the activation time could be as long as 40 hours or more. A reasonable activation time, however, should be less than 10 hours, and it is preferred that the holding time be about in the magnitude of 5 to 6 hours. The exact time for activation depends ultimately on variations in plant design, and it is better to control the holding period by the dew point of the activation air leaving the activator. This dew point can be measured at any point in the system if proper corrections are made for the makeup and purge streams. When possible, the dew point can be measured upstream from the point at which the makeup air enters the recycle stream, although in the embodiment shown in the drawing, dew point indicator recorder 59 is located across the blowers 22 and 22a in order to obtain maximum pressure drop for its operation. A suitable instrument of this type is a Foxboro Dewcel[1] plus a Foxboro Dynalog[1] recorder. These units are described on pages 33 and 64 respectively of Bulletin 450 of the Foxboro Company, Foxboro, Massachusetts. It is preferred that the catalyst be activated at a temperature in the range of 800 to 1700° F. and held at this temperature until the air leaving the catalyst mass has obtained a dew point of not over 0° F. and preferably about −40° F. or less. When an activation temperature in this preferred range is employed, the makeup air should be channeled through the air dryers when the catalyst mass has reached a temperature of approximately 750° F. After the catalyst has been activated, fuel to the air heater is cut off and the catalyst mass is allowed to cool while continuing the recirculation and fluidization. The dew point measuring instrument can be adapted to close the valve in the air heater fuel line at any predetermined dew point value. When the catalyst is cooled to approximately 100 to 200° F., it is dropped through lines 61 or 61a to catalyst receivers 62 and 62a. Interstitial air is purged from the catalyst voids by inert gas, such as nitrogen, entering through conduit 63; and an inert gas blanket is maintained over the catalyst until it is ready to be used for the polymerization process.

In further clarification of our invention, a specific example will be discussed in connection therewith.

Approximately 2,000 pounds of polymerization catalyst (dry basis) containing 2.5 weight percent chromium oxide impregnated on a silica-alumina base and having an average particle size of 70 microns (70% between 50 and 90 microns) is charged to the activation chamber by a pneumatic system. The raw catalyst as charged contains 200 pounds of water. During charging, air is ---
[1] Trademark.

circulated through the activation chamber to fluidize the catalyst bed.

After charging, fuel gas is fed to the heater and the temperature of the catalyst is raised to 1000° F. over a period of 6 hours. Makeup air is meanwhile fed continuously to the activation system after being filtered, cooled, and separated from condensed moisture. The makeup air flow rate is maintained substantially constant at about 10 volume percent of the recirculation stream. When the catalyst temperature reaches 750° F., the makeup air is routed through the bauxite dryers and a dew point of −40° F. is maintained for all makeup air throughout the remainder of the activation cycle.

Recirculation air flows unrestricted through the air fin cooler bypass until the temperature of the air at the blower intake reaches 600° F., at which point the temperature controller begins operation, routing more air through the cooler in order to maintain the blower inlet air below 600° F. The air immediately downstream of the air fin cooler is about 400° F. and at this point air is purged to the bag filters thus maintaining the pressure at the purge outlet substantially constant. For satisfactory fluidization and disengaging of catalyst in the activation chamber the air velocity in the fluidizing section is about 1.3 feet per second and the velocity in the disengaging section is about 0.35 foot per second.

The fluidization of the catalyst bed is controlled by maintaining a constant pressure drop across the bed by controlling the blower speed and a valve in the activator air inlet line. Suppose, for example, that during the activation cycle a channel or "blow-hole" opens up in the catalyst bed. This reduces the pressure drop across the bed and the differential pressure controller activates the motor valve in the air inlet line to reduce the air flow therethrough. This allows the bed to settle, close the channel and the pressure drop returns to its normal level.

In order to operate this type of fluidization control successfully, a substantially constant pressure and air flow rate should be maintained within the system. Our invention permits this even though the activation air is recycled. As makeup air is added to the system, the pressure tends to rise and a corresponding amount of air is purged, thus returning the pressure to normal. In this way an average of about 10 volume percent of the activation air is continuously urged thereby enabling recirculation and fluidization control substantially independent of the makeup and purge rates. During the heat-up and cooling portions of the activation cycle more and less air, respectively, is purged which is as desired for removal of catalyst poisons.

When the catalyst reaches 1000° F., the temperature is stabilized and the activation continued at this temperature until the dew point of the air leaving the catalyst mass reaches −40° F. After about five hours this point is reached and the fuel gas to the air heater is cut off. The catalyst is cooled to 200° F. over a period of 6 hours, after which it is dropped to a catalyst receiver. Nitrogen is introduced at the bottom of the receiver and air is purged from the catalyst mass. When the air has been removed, a blanket of nitrogen is maintained over the catalyst until it is needed for the polymerization reaction. About 1900 pounds of activated catalyst are produced and about 100 pounds of catalyst fines are recovered from the bag filters. Substantially all of the 200 pounds of water is removed.

While this invention has been discussed in terms of specific examples and embodiments, it should be understood that these examples have been used for illustrative purposes only, and several modifications can be made within the scope of our invention by those skilled in the art.

We claim:

1. In a batch process for activating particulate polymerization catalyst comprising chromium oxide, a portion of the chromium being in the hexavalent state in an activated condition wherein said catalyst is fluidized in an activation zone by contact with air, the improvement which comprises passing a fluidizing stream of air through said activation zone in a closed recirculating loop, heating said air stream and thereby heating said catalyst to an activation temperature in the range of 400 to 1750° F., holding said catalyst at activation temperature for a period of time sufficient to activate said catalyst and at least until the dew point of said air stream is in the range of about 0° F. and below, thereafter cooling said air stream and thereby cooling said catalyst to below 400° F., continuously adding make-up air to said recirculating air stream at a substantially constant rate during said heating, holding, and cooling steps, said make-up air being maintained dry at least during said holding and cooling steps, and maintaining the pressure in said loop substantially constant by continuously purging air from said air stream during said heating, holding and cooling steps.

2. The process of claim 1 wherein said make-up gas is dried to a dew point in the range of about −40° F. and below at least during said holding and cooling steps.

3. In a batch process for activating particulate polymerization catalyst comprising chromium oxide, a portion of the chromium being in the hexavalent state in an activated condition wherein said catalyst is fluidized in an activation zone by contact with air, the improvement which comprises passing a fluidizing stream of air through said activation zone in a closed recirculating loop, heating said air stream and thereby heating said catalyst to an activation temperature in the range of 800 to 1700° F., holding said catalyst at activation temperature for a period of time sufficient to activate said catalyst and until the dew point of said air stream is in the range of about 0° F. and below, thereafter cooling said air stream and thereby cooling said catalyst to below about 200° F., continuously adding make-up air to said recirculating air stream at a substantially constant rate during said heating, holding, and cooling steps, said make-up air being dried at least during said holding and cooling steps, and maintaining the pressure in said loop substantially constant by continuously purging air from said air stream during said heating, holding and cooling steps.

4. In a batch process for activating particulate polymerization catalyst comprising chromium oxide, a portion of the chromium being in the hexavalent state in an activated condition wherein said catalyst is fluidized in an activation zone by contact with air, the improvement which comprises passing a fluidizing stream of air through said activation zone in a closed recirculating loop to maintain said catalyst in a fluidized bed, heating said air stream and thereby heating said catalyst to an activation temperture in the range of 800 to 1700° F., holding said catalyst at activation temperature until the dew point of said air stream is in the range of about 0° F. and below, thereafter cooling said air stream and thereby cooling said catalyst to about 100 to 200° F., continuously adding make-up air to said air stream at a substantially constant rate during said heating, holding and cooling steps, drying said make-up air to a dew point in the range of −40° F. and below at least during said holding and cooling steps, and maintaining the pressure in said loop substantially constant by continuously purging air from said air stream during said heating, holding, and cooling steps.

5. The process of claim 4 wherein said drying step for said make-up gas is begun when the catalyst temperature reaches about 750° F.

6. The process of claim 4 wherein said catalyst has an average particle size in the range of 10 to 500 microns, said catalyst bed is fluidized with air at a velocity of about 0.1 to 10 feet per second and said catalyst is disengaged from said air stream by reducing the air velocity above said bed to about 0.01 to 9 feet per second.

7. The process of claim 6 wherein said air velocity is regulated in response to a differential pressure measurement taken across said catalyst bed.

8. In a batch process for activating particulate polymerization catalyst comprising chromium oxide, a portion of the chromium being in the hexavalent state when the catalyst is in an activated condition wherein said catalyst having an average particle size in the range of 10 to 500 microns is fluidized in an activation zone by contact with air, the improvement which comprises maintaining said catalyst in a fluidized bed by passing a stream of air into the lower portion of said activation zone and through said bed at a velocity of about 1.2 to 1.6 feet per second, reducing the velocity of said air stream immediately above said bed to about 0.3 to 0.4 foot per second thereby disengaging entrained catalyst from said stream, regulating the air velocity through said bed in response to a differential pressure measurement taken across said catalyst bed, removing said air stream from the upper portion of said activation zone and recirculating said stream back to said lower portion, heating said air stream being recirculated and thereby heating said catalyst to an activation temperature in the range of 800 to 1700° F., holding said catalyst at activation temperature until the dew point of said air stream being removed from said activation zone reaches a value of about 0° F. and below, thereafter cooling said air stream and thereby cooling said catalyst to about 100 to 200° F., continuously adding make-up air to said air stream at a substantially constant rate in an amount equal to about 5 to 25 volume percent of the total recirculating air stream during said heating, holding and cooling steps, drying said make-up air to a dew point in the range of $-40°$ F. and below during at least said holding and cooling steps, continuously purging air from said recirculating air stream at a point downstream from said activation zone in an amount necessary to maintain a substantially constant pressure at said purge point, cooling at least a portion of said air stream between said activation zone and said purge point during said heating and holding steps, and storing the activated catalyst under dry nitrogen following said cooling step.

References Cited in the file of this patent

UNITED STATES PATENTS

| | | |
|---|---|---|
| 2,225,402 | Liedholm | Dec. 17, 1940 |
| 2,406,112 | Schulze | Aug. 20, 1946 |
| 2,511,652 | Shand | June 13, 1950 |
| 2,515,245 | Mattox | July 18, 1950 |
| 2,530,977 | Martin | Nov. 21, 1950 |
| 2,534,778 | Kuhn | Dec. 19, 1950 |
| 2,543,863 | Martin | Mar. 6, 1951 |
| 2,562,804 | Martin et al. | July 31, 1951 |
| 2,749,287 | Kirshenbaum | June 5, 1956 |
| 2,755,230 | Guernsey | July 17, 1956 |
| 2,845,409 | Pennington et al. | July 29, 1958 |